Sept. 30, 1952          H. SINGER          2,612,352
SAFETY SHIELD
Filed June 27, 1950
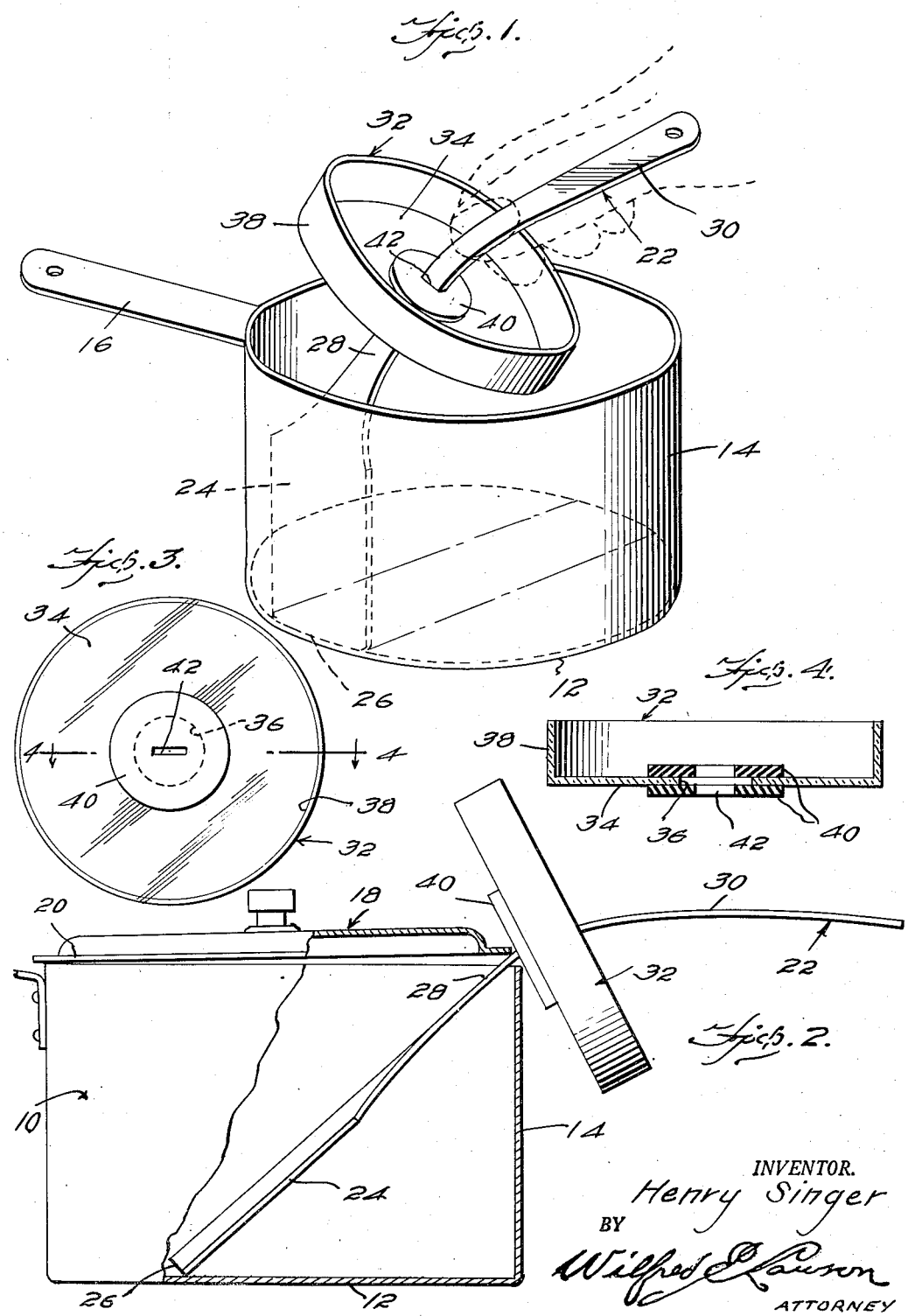

UNITED STATES PATENT OFFICE 2,612,352

SAFETY SHIELD

Henry Singer, Honolulu, Territory of Hawaii, assignor of one-half to John K. Goo Kim, Jr., Honolulu, Territory of Hawaii Application June 27, 1950, Serial No. 170,606

1 Claim. (Cl. 259—1)

This invention relates to an agitator and more particularly to a device for maintaining solids in suspension in liquid contained in a cooking vessel while the vessel is being heated.

It is well known that during the preparation of foodstuffs, particularly such foodstuffs as cooked cereals, thickened gravies, and others containing corn starch or the like are subject to the settling on the bottom of the cooking vessels of at least some of the solids contained in the liquid in which it is being cooked in the vessel. Such settling of the solids frequently causes burning and scorching of the solids on the bottom of the vessel so that in order to maintain the solids in suspension during the cooking process frequent stirring of the contents of the vessel must be resorted to. As a consequence it has been customary to use a conventional spoon as the stirring implement, but owing to the contour of the spoon bowl it has been extremely difficult to thoroughly scrape the bottom of the cooking vessel with the result that streaks of the thick and heavier solids have been left on the bottom of the vessel to burn or scorch and hence destroy the flavor of the contents of the vessel.

The primary object of this invention is to prevent the deposit of heavier solids on the bottom of a cooking vessel and to avoid the burning and scorching of the contents of the vessel.

Another object is to maintain in suspension in the liquid contained in the vessel all of the solids contained in the mixture being cooked so as to avoid destroying the delicate flavor of the product through burning and scorching.

The above and other objects may be attained by employing this invention which embodies among its features a scraper blade of substantially rectangular contour having a bottom edge which conforms substantially to the contour of the bottom of the cooking vessel in which it is used, a shank carried by the blade and extending upwardly therefrom, a handle on the shank, and a guard or shield carried by the shank adjacent the handle for protecting the hand of the user against burning and scalding while stirring the contents of a cooking vessel.

Other features include curving the blade to conform to the curvature of the side walls of the vessel and supporting the shield on the shank for longitudinal adjustment thereon.

In the drawings:

Figure 1 is a perspective view of a cooking vessel containing foodstuffs suspended in a liquid therein and illustrating my improved agitator in place ready to be drawn across the bottom of the vessel to loosen any of the solid foodstuff that may tend to adhere thereto, Figure 2 is a side view partly in section showing the scraper lying across the vessel with the shield thereof extending over the upper edge to support the scraper in place in the vessel and the cover of the vessel in a position to permit the escape of steam therefrom, Figure 3 is a plan view of the hand shield, and Figure 4 is a sectional view through the shield employed in connection with the scraper.

Referring to the drawings in detail a cooking vessel designated generally 10 in the present instance embodies a relatively flat bottom 12 of substantially circular formation which carries adjacent its periphery a substantially cylindrical side wall 14 which extends substantially perpendicular to the bottom 12. Attached to the side wall in any conventional manner is a conventional handle 16 by which the vessel may be maneuvered or transported all in a conventional manner. The vessel is equipped with a conventional cover 18 having an annular peripheral flange 20 which normally rests on the upper edge of the side wall 14 to form a closed chamber within the vessel.

My improved agitator designated generally 22 comprises a substantially rectangular blade 24, the bottom edge 26 of which is shaped to conform to the contour of the bottom 12 of the vessel 10 so that as the blade is moved diametrically across the bottom the entire lower edge 26 of the blade contacts a portion of the bottom equivalent to the width of the blade 24. In the preferred form of the invention, the blade 24 is curved to conform substantially to the curvature of the side wall 14 of the vessel 10 so that by moving the blade vertically against the side wall any foodstuffs adhering thereto may be loosened and placed in suspension in the contents of the vessel. Extending upwardly from the edge of the blade 24 remote from the edge 26 is a shank 28 which carries at its upper end a handle 30 which in the preferred form of the invention inclines angularly relative to the shank 28 and lies at an angle to the blade 24. By so disposing the angular relation of the handle 30 to the blade 24, it is evident that the user may easily maintain the blade in proper position during the scraping of the bottom 12 of the vessel 10.

In order to guard the hand of the user and protect it against scalds and burns during the scraping operation, a shield designated generally 32 is carried by the shank 28 adjacent its junction with the shank and the handle 30. This shield comprises a substantially disk shaped body 34, preferably of a transparent material which is provided with an axial opening 36 through which the handle 30 and shank 28 are respectively passed in placing the shield on the agitator 22. Carried by the periphery of the body 34 is an outstanding annular collar or wall 38 which projects toward the hand of the user to form together with the disk shaped body 34 a substantially shallow pan-like guard which deflects steam rising from the cooking food and any of the cooking food that might be thrown upwardly against the hand of the user owing to the ebullition thereof. In order to hold the shield 32 in various adjusted positions on the shank 28 I secure to opposite sides of the disk shaped body 34 disks 40 of rubber or the like, and extending transversely of each disk 40 and in aligning relation to one another is a slot 42 which aligns with the axial opening 36. These slots receive the handle 30 and shank 28 respectively, and the walls thereof yieldingly engage the shank 28 so as to hold the shield 32 in the desired position thereon.

In use when the user desires to scrape the bottom of a cooking vessel containing liquid and foodstuffs in suspension therein, he grasps the handle 30 and moves the scraper blade 24 across the bottom 12 of the vessel 10. Obviously the shield 32 will protect the hand of the user against injury by the boiling liquid, and owing to the fact that the bottom edge 26 of the blade 24 conforms to the contour of the bottom 12 of the vessel 10 it will be evident that by carefully manipulating the scraper no streaks of foodstuffs will be left in the bottom to scorch and burn. When the scraping operation has been completed, the shield 32 is extended over the upper edge of the side wall 14 of the vessel 10 as suggested in Figure 2 to retain the scraper in upright position within the vessel and ready for a repeat operation. Obviously material which may adhere to the side walls 14 of the vessel may be scraped therefrom by pressing the blade 24 against said side wall and moving it vertically.

While in the foregoing there has been shown and described the preferred form of this invention, it is to be understood that minor changes in the details of construction, combination and arrangement of parts may be resorted to without departing from the spirit and scope of the invention as claimed.

I claim:

A shield for protecting the hand of the user of an agitator-scraper for cooking utensils, comprising a flat metal disk of substantial area having an axial opening to receive the handle of the agitator-scraper therethrough, an upstanding flange encircling the perimeter of said disk, and a disk of a flexible material secured on each side of said metal disk and overlying and underlying the said opening, each of said flexible material disks having an incision centered with respect to the said opening for the extension of the handle through the same and said incision of each disk being spaced all around a substantial distance from the edge of the opening whereby said handle will be held out of contact with the said metal disk.

HENRY SINGER.

REFERENCES CITED

The following references are of record in the file of this patent:

UNITED STATES PATENTS

| Number | Name | Date |
| --- | --- | --- |
| 857,975 | Barrett | June 25, 1907 |
| 1,460,007 | Williams | June 26, 1923 |
| 1,498,509 | Arnold | June 17, 1924 |
| 2,039,277 | Baehr | May 5, 1936 |

FOREIGN PATENTS

| Number | Country | Date |
| --- | --- | --- |
| 14,243 | Great Britain | June 26, 1895 |